United States Patent
Liang et al.

(10) Patent No.: US 9,600,861 B2
(45) Date of Patent: Mar. 21, 2017

(54) SINGLE IMAGE SUPER-RESOLUTION METHOD USING TRANSFORM-INVARIANT DIRECTIONAL TOTAL VARIATION WITH S½+L½-NORM

(71) Applicant: Macau University of Science and Technology, Macau (MO)

(72) Inventors: Yong Liang, Macau (MO); Zong Ben Xu, Macau (MO); Liang-Yong Xia, Macau (MO); Xiao-Ying Liu, Macau (MO)

(73) Assignee: Macau University of Science and Technology, Macau (MO)

( * ) Notice: Subject to any disclaimer, the term of this patent is extended or adjusted under 35 U.S.C. 154(b) by 0 days.

(21) Appl. No.: 14/835,692

(22) Filed: Aug. 25, 2015

(65) Prior Publication Data

US 2017/0024855 A1   Jan. 26, 2017

Related U.S. Application Data

(60) Provisional application No. 62/197,025, filed on Jul. 26, 2015.

(51) Int. Cl.
*G06T 3/00* (2006.01)
*G06T 3/40* (2006.01)

(52) U.S. Cl.
CPC .......... *G06T 3/4053* (2013.01); *G06T 3/0006* (2013.01)

(58) Field of Classification Search
CPC ............... G06T 3/006; G06T 3/4053–3/4076
See application file for complete search history.

(56) References Cited

U.S. PATENT DOCUMENTS

2012/0133779 A1* 5/2012 Ma .................. G06K 9/6249
348/175

OTHER PUBLICATIONS

Translation of Chinese Document Rao et al "Robust Sparse and Low-rank matrix decomposition based on S½ modeling" Science China ser. F 2013 (Cited in the IDS).*

(Continued)

*Primary Examiner* — Sean Motsinger
(74) *Attorney, Agent, or Firm* — Spruson & Ferguson (Hong Kong) Limited; Sam T. Yip

(57) ABSTRACT

A super-resolution method for generating a high-resolution (HR) image from a low-resolution (LR) blurred image is provided. The method is based on a transform-invariant directional total variation (TI-DTV) approach with Schatten$_{p=1/2}$ ($S_{1/2}$-norm) and $L_{1/2}$-norm penalties. The $S_{1/2}$-norm and the $L_{1/2}$-norm are used to induce a lower-rank component and a sparse component of the LR blurred image so as to determine an affine transform to be adopted in the TI-DTV approach. In particular, the affine transform is determined such that a weighted sum of the $S_{1/2}$-norm and the $L_{1/2}$-norm is substantially minimized. Based on the alternating direction method of multipliers (ADMM), an iterative algorithm is developed to determine the affine transform. The determined affine transform is used to transform a candidate HR image to a transformed image used in computing a directional total variation (DTV), which is involved in determining the HR image.

6 Claims, 7 Drawing Sheets

(56) References Cited

OTHER PUBLICATIONS

Farsiu, S. et al., "Fast and robust multiframe super resolution," IEEE Transactions on Image Processing, vol. 13, No. 10, pp. 1327-1344, 2004.
Wang, Y., et al., "A new alternating minimization algorithm for total variation image reconstruction," SIAM Journal on Imaging Sciences, vol. 1, No. 3, pp. 248-272, 2008.
Çetin, M, and Karl, W.C., "Feature-enhanced synthetic aperture radar image formation based on nonquadratic regularization," IEEE Transactions on Image Processing, vol. 10, No. 4: pp. 623-631, 2001.
Deng, L.J., Guo, W, and Huang, T.Z., "Single image super-resolution by approximated Heaviside functions," arXiv preprint arXiv:1503.03630, 2015.
Park, S.C., Park, M.K., and Kang, M.G., "Super-resolution image reconstruction: a technical overview," IEEE Signal Processing Magazine, vol. 20, No. 3, pp. 21-36, 2003.
Glasner, D, Bagon, S, and Irani, M., "Super-resolution from a single image," Proceedings of IEEE 12th International Conference on Computer Vision, pp. 349-356, 2009.
Li, X., and Orchard, M.T., "New edge-directed interpolation," IEEE Transactions on Image Processing, vol. 10, No. 10, pp. 1521-1527, 2001.
Zhang, L, and Wu, X., "An edge-guided image interpolation algorithm via directional filtering and data fusion," IEEE Transactions on Image Processing, vol. 15, No. 8, pp. 2226-2238, 2006.
Cha, Y., Lee, G.Y., and Kim, S., "Image zooming by curvature interpolation and iterative refinement," SIAM Journal on Imaging Sciences, vol. 7, No. 2, pp. 1284-1308, 2014.
Getreuer, P., "Contour stencils: Total variation along curves for adaptive image interpolation," SIAM Journal on Imaging Sciences, vol. 4, No. 3, pp. 954-979, 2011.
Wang, L, Wu, H, and Pan, C., "Fast image ppsampling via the displacement field," IEEE Transactions on Image Processing, vol. 23, No. 12, pp. 5123-5135, 2014.
Freeman, W.T., Pasztor, E.C., and Carmichael, O.T., "Learning low-level vision," International Journal of Computer Vision, vol. 40, No. 1, pp. 25-47, 2000.
Sun, J. et al., "Image hallucination with primal sketch priors," Proceedings of IEEE Conference on Computer Vision and Pattern Recognition (CVPR), pp. 2:729-736, 2003.
Sun, J., Xu, Z., and Shum, H.Y., "Image super-resolution using gradient profile prior," Proceedings of IEEE Conference on Computer Vision and Pattern Recognition (CVPR), pp. 1-8, 2008.
Yang, J. et al. "Image super-resolution via sparse representation," IEEE Transactions on Image Processing, vol. 19, No. 11, pp. 2861-2873, 2010.
Capel, D., and Zisserman, A., "Super-resolution enhancement of text image sequences," Proceedings of 15th IEEE International Conference on Pattern Recognition, vol. 1, pp. 600-605, 2000.
Fattal, R., "Image upsampling via imposed edge statistics," ACM Transactions on Graphics (TOG), vol. 26, No. 3, pp. 95, 2007.
Dong, W. et al., "Image deblurring and super-resolution by adaptive sparse domain selection and adaptive regularization," IEEE Transactions on Image Processing, vol. 20, No. 7, pp. 1838-1857, 2011.
Farsiu, S., Elad, M., and Milanfar, P., "Multiframe demosaicing and super-resolution of color images," IEEE Transactions on Image Processing, vol. 15, No. 1, pp. 141-159, 2006.
Fernandez-Granda, C., and Candes, E.J., "Super-resolution via transform-invariant group-sparse regularization," Proceeding of 2013 IEEE International Conference on Computer Vision (ICCV), pp. 3336-3343, 2013.
Glasner, D., Bagon, S., and Irani, M., "Super-resolution from a single image," Proceedings of 2009 IEEE 12th International Conference on Computer Vision, pp. 349-356, 2009.
Atkins, C.B., Bouman, C.A., and Allebach, J.P., "Optimal image scaling using pixel classification," Proceedings of 2001 International Conference on Image Processing, vol. 3, pp. 864-867, 2001.
Zhang Z. Ganesh, A. Liang, X. and Ma, Y., "TILT: transform-invariant low-rank textures," International Journal of Computer Vision, vol. 99, No. 1, 1-24, Aug. 2012.
Rao, G., Peng, Y., and Xu, Z.B., "Robust sparse and low-rank components decomposition based on $S^{1/2}$ modeling," Science China, Ser. F, vol. 43, No. 6, pp. 733-748, 2013.
Lin, Z., Chen, M., and Ma, Y., "The augmented lagrange multiplier method for exact recovery of corrupted low-rank matrices," arXiv preprint arXiv:1009.5055, 2010.
Boyd, S. et al., "Distributed optimization and statistical learning via the alternating direction method of multipliers," Foundations and Trends® in Machine Learning, vol. 3, No. 1, pp. 1-122, 2011.
Xu, Z. et al. "$L^{1/2}$ regularization: A thresholding representation theory and a fast solver," IEEE Transactions on Neural Networks and Learning Systems, vol. 23, No. 7, pp. 1013-1027, 2012.
Becker, S.R., Candès, E.J., and Grant, M.C., "Templates for convex cone problems with applications to sparse signal recovery," Mathematical Programming Computation, vol. 3, No. 3, pp. 165-218, 2011.
Xiao, J. et al., "Sun database: Large-scale scene recognition from abbey to zoo," Proceedings of 2010 IEEE conference on Computer vision and pattern recognition (CVPR), pp. 3485-3492, 2010.
Zhu X.X., and Bamler, R., "Super-resolution power and robustness of compressive sensing for spectral estimation with application to spaceborne tomographic SAR," IEEE Transactions on Geoscience and Remote Sensing, vol. 50, No. 1, pp. 247-258, 2012.
Zhu, X.X., and Bamler, R., "Tomographic SAR inversion by-norm regularization—The compressive sensing approach," IEEE Transactions on Geoscience and Remote Sensing, vol. 48, No. 10, pp. 3839-3846, 2010.
Xu, Z.B., Zhang, H., Wang, Y., Chang, X.Y., and Liang, Y., "$L^{1/2}$ regularization," Science China, Ser. F, vol. 40, No. 3, pp. 1-11, 2010.

\* cited by examiner

FIG. 3

SINGLE IMAGE SUPER-RESOLUTION METHOD USING TRANSFORM-INVARIANT DIRECTIONAL TOTAL VARIATION WITH S½+L½-NORM

CROSS-REFERENCE TO RELATED APPLICATIONS

This application claims the benefit of U.S. Provisional Patent Application No. 62/197,025, filed on Jul. 26, 2015, which is incorporated by reference herein in its entirety.

BACKGROUND

Field of the Invention

The present invention generally relates to increasing the resolution of blurred images in computer vision and image processing. In particular, the present invention relates to an image super-resolution method when there is only one low-resolution image as an input.

LIST OF REFERENCES

There follows a list of references that are occasionally cited in the specification. Each of the disclosures of these references is incorporated by reference herein in its entirety.

[1] Farsiu, S. et al., "Fast and robust multiframe super resolution," IEEE Transactions on Image Processing, vol. 13, no. (10), pp. 1327-1344, 2004

[2] Wang, Y., et al., "A new alternating minimization algorithm for total variation image reconstruction," SIAM Journal on Imaging Sciences, vol. 1, no. (3), pp. 248-272, 2008.

[3] çetin, M, and Karl, W. C., "Feature-enhanced synthetic aperture radar image formation based on nonquadratic regularization," IEEE Transactions on Image Processing, vol. 10, no. (4): pp. 623-631, 2001.

[4] Deng, L. J., Guo, W, and Huang, T. Z., "Single image super-resolution by approximated Heaviside functions," arXiv preprint arXiv:1503.03630, 2015.

[5] Park, S. C., Park, M. K., and Kang, M. G., "Super-resolution image reconstruction: a technical overview," IEEE Signal Processing Magazine, vol. 20, no. (3), pp. 21-36, 2003.

[6] Glasner, D, Bagon, S, and Irani, M., "Super-resolution from a single image," Proceedings of IEEE 12th International Conference on Computer Vision, pp. 349-356, 2009.

[7] Li, X., and Orchard, M. T., "New edge-directed interpolation," IEEE Transactions on Image Processing, vol. 10, no. (10), pp. 1521-1527, 2001.

[8] Zhang, L, and Wu, X., "An edge-guided image interpolation algorithm via directional filtering and data fusion," IEEE Transactions on Image Processing, vol. 15, no. (8), pp. 2226-2238, 2006.

[9] Cha, Y., Lee, G. Y., and Kim, S., "Image zooming by curvature interpolation and iterative refinement," SIAM Journal on Imaging Sciences, vol. 7, no. (2), pp. 1284-1308, 2014.

[10] Getreuer, P., "Contour stencils: Total variation along curves for adaptive image interpolation," SIAM Journal on Imaging Sciences, vol. 4, no. (3), pp. 954-979, 2011.

[11] Wang, L., Wu, H, and Pan, C., "Fast image ppsampling via the displacement field," IEEE Transactions on Image Processing, vol. 23, no. (12), pp. 5123-5135, 2014.

[12] Freeman, W. T., Pasztor, E. C., and Carmichael, O. T., "Learning low-level vision," International Journal of Computer Vision, vol. 40, no. (1), pp. 25-47, 2000.

[13] Sun, J. et al., "Image hallucination with primal sketch priors," Proceedings of IEEE Conference on Computer Vision and Pattern Recognition (CVPR), pp. 2:729-736, 2003.

[14] Sun, J., Xu, Z., and Shum, H. Y., "Image super-resolution using gradient profile prior," Proceedings of IEEE Conference on Computer Vision and Pattern Recognition (CVPR), pp. 1-8, 2008

[15] Yang, J. et al. "Image super-resolution via sparse representation," IEEE Transactions on Image Processing, vol. 19, no. (11), pp. 2861-2873, 2010.

[16] Capel, D., and Zisserman, A., "Super-resolution enhancement of text image sequences," Proceedings of 15th IEEE International Conference on Pattern Recognition, vol. 1, pp. 600-605, 2000

[17] Fattal, R., "Image upsampling via imposed edge statistics," ACM Transactions on Graphics (TOG), vol. 26, no. (3), pp. 95, 2007.

[18] Dong, W. et al., "Image deblurring and super-resolution by adaptive sparse domain selection and adaptive regularization," IEEE Transactions on Image Processing, vol. 20, no. (7), pp. 1838-1857, 2011.

[19] Farsiu, S., Elad, M., and Milanfar, P., "Multiframe demosaicing and super-resolution of color images," IEEE Transactions on Image Processing, vol. 15, no. (1), pp. 141-159, 2006.

[20] Fernandez-Granda, C., and Candes, E. J., "Super-resolution via transform-invariant group-sparse regularization," Proceeding of 2013 IEEE International Conference on Computer Vision (ICCV), pp. 3336-3343, 2013.

[21] Glasner, D., Bagon, S., and Irani, M., "Super-resolution from a single image," Proceedings of 2009 IEEE 12th International Conference on Computer Vision, pp. 349-356, 2009.

[22] Atkins, C. B., Bouman, C. A., and Allebach, J. P., "Optimal image scaling using pixel classification," Proceedings of 2001 International Conference on Image Processing, vol. 3, pp. 864-867, 2001.

[23] Zhang, Z., Ganesh, A., Liang, X., and Ma, Y., "TILT: transform-invariant low-rank textures," International Journal of Computer Vision, vol. 99, no. (1), 1-24, Aug. 2012.

[24] Rao, G., Peng, Y., and Xu, Z. B., "Robust sparse and low-rank components decomposition based on $S_{1/2}$ modeling," Science China, Ser. F, vol. 43, no. (6), pp. 733-748, 2013.

[25] Lin, Z., Chen, M., and Ma, Y., "The augmented lagrange multiplier method for exact recovery of corrupted low-rank matrices," arXiv preprint arXiv:1009.5055, 2010.

[26] Boyd, S. et al., "Distributed optimization and statistical learning via the alternating direction method of multipliers," Foundations and Trends® in Machine Learning, vol. 3, no. (1), pp. 1-122, 2011.

[27] Xu, Z. et al. "$L_{1/2}$ regularization: A thresholding representation theory and a fast solver," IEEE Transactions on Neural Networks and Learning Systems, vol. 23, no. (7), pp. 1013-1027, 2012.

[28] Becker, S. R., Candes, E. J., and Grant, M. C., "Templates for convex cone problems with applications to sparse signal recovery," Mathematical Programming Computation, vol. 3, no. (3), pp. 165-218, 2011.

[29] Xiao, J. et al., "Sun database: Large-scale scene recognition from abbey to zoo," Proceedings of 2010 IEEE

[30] Zhu X. X., and Bamler, R., "Super-resolution power and robustness of compressive sensing for spectral estimation with application to spaceborne tomographic SAR," *IEEE Transactions on Geoscience and Remote Sensing*, vol. 50, no. (1), pp. 247-258, 2012.

[31] Zhu, X. X., and Bamler, R., "Tomographic SAR inversion by-norm regularization—The compressive sensing approach," *IEEE Transactions on Geoscience and Remote Sensing*, vol. 48, no. (10), pp. 3839-3846, 2010.

[32] Xu, Z. B., Zhang, H., Wang, Y., Chang, X. Y., and Liang, Y., "$L_{1/2}$ regularization," *Science China, Ser. F*, vol. 40, no. (3), pp. 1-11, 2010.

DESCRIPTION OF RELATED ART

An interesting problem is to increase resolution of blurred images in computer vision and image processing. The super-resolution (SR) is the process of combining one or multiple low-resolution (LR) blurred images to produce a high-resolution (HR) image [1]. For example, for magnetic resonance imaging (MRI) [2], it is to need more time and costs to get high SR images. For synthetic aperture radar (SAR) [3] and satellite imaging, it is impossible to get high SR images because of long distance and air turbulence [4]. Therefore, it is significant to develop a more effective image SR algorithm. When only one LR image as input, it is referred to as single image SR. The other situation is multiple image SR. Compared to multiple image SR, it is more challenging for the SR when only one LR image as input. In most cases, because of the limitation of the hardware and high costs, we can only get the single LR image for an objective.

Generally, the image SR methods are divided into five categories: interpolation-based methods, learning-based methods, statistics-based methods, hybrid methods and regularization methods.

Recently, many image SR methods are interpolation-based. Nearest-neighbor interpolation [5] estimates an unknown location using that the nearest neighbor point. However, it leads to jaggy effect. Bicubic interpolation [6] interpolates unknown intensity utilizing a cubic kernel. However, it results in blur effect. In [7], Li et al. present a novel edge-orientation adaptive interpolation method for resolution enhancement and propose to estimate local covariance characteristics at low resolution. It is clever to use them to direct the interpolation at HR based on resolution invariant property of edge orientation. In [8], Zhang et al. propose a new edge-guided nonlinear interpolation technique through directional filtering and data fusion. A pixel to be interpolated requires two observation sets which are orthogonal directions, and different noisy measurements of the missing pixel are fused by the linear minimum mean square-error estimation (LMMSE) technique. In [9], Cha et al. propose the curvature interpolation method (CIM). A reliable image surface is constructed by using the generalized curvature source term estimated from the LR image. In [10], Getreuer et al. adopt a contour stencils method to estimate the image contours which are based on total variation (TV) along curves. This method can distinguish different direction lines and curves, etc., and produce HR images own details based on a computationally efficient formula. In [11], Wang et al. introduce a fast image SR method on the displacement field. However, the method requires two stages. One stage is to pick up low-frequency image by an interpolation technique. The other one is to recover local high-frequency structures by a reconstruction method.

Learning-based methods need two large training datasets. One consists of LR images and the other one contains their corresponding HR images. The relation between the two training datasets is then learnt. We apply it to given LR images in order to obtain HR images. However, the relation is sensitive to datasets that are selected. In [12], Freeman et al. describe a learning-based method for low-level vision problems—estimating scenes from images. A Markov network is to model relationships among the scenes and their corresponding rendered images. Then Bayesian belief propagation is used to find a local maximum of the posterior probability for the scene, given an image. In [13], Sun et al. propose a Bayesian approach to image hallucination. Moreover, by using a Markov-chain based inference algorithm, a contour smoothness constraint enforces consistency of primitives in the hallucinated image. In [14], Sun et al. introduce a novel generic image prior-gradient profile prior, which is a parametric prior describing the shape and the sharpness of the image gradients. In [15], Yang et al. propose a sparse signal representation method, which jointly trains two dictionaries for the LR and HR image patches, and then applies the generated dictionaries to a LR image to get the corresponding HR image.

Statistics-based methods are also a popular tool for image SR. In [16], Capel et al. propose maximum a posteriori (MAP) and maximum likelihood (ML) estimator in order to get image SR. In [17], Fattal et al. propose a new method which is based on a statistical edge dependency relating certain edge features of two different resolutions.

On the other hand, some hybrid methods have been proposed for image SR. In [21], Glasner et al. use the hybrid method which combines the classical multi-image SR (combining images obtained at subpixel misalignments) with example-based SR (learning correspondence between low and high resolution image patches from a database). In [22], Atkins et al. utilize the pixel classification method which introduces that: the pixel being interpolated is first classified in the context of a window of neighboring pixels; and then the corresponding high resolution pixels are obtained by filtering with coefficients that depend upon the classification.

In recent years, a novel method for image SR is regularization approach which is a process of solving an ill-posed problem or preventing overfitting based on additional information in the fields of mathematics, statistics and machine learning. This information is usually of the form of a penalty for complexity, such as restrictions for smoothness or bounds on the vector space norm. In [18], Dong et al. introduce two adaptive regularization terms into the sparse representation framework for SR. In [19], Farsiu et al. introduce bilateral regularization and tikhonov regularization approaches. Bilateral regularization is used for spatially regularizing the luminance component. Simultaneously, tikhonov regularization is used to smooth the chrominance components. In [20], Fernandez et al. propose the transform-invariant directional total variation approach with transform-invariant low-rank textures (TI-DTV+TILT), which is the data-driven and non-parametric regularization method, was demonstrated the capability of constraining non-local image structure to achieve high SR images. In [1], Farsiu et al. use an alternate approach based on $L_1$-norm minimization and robust regularization with a bilateral prior to deal with different data and noise models. In [30], Zhu et al. introduce "Scale-down by $L_1$-norm Minimization, Model selection, and Estimation Reconstruction" (SL1MMER), which is a spectral estimation algorithm based on compressive sensing, model order selection, and final maximum likelihood parameter estimation. In [31], Zhu et al. use $L_1$-norm regularization to process Tomographic SAR Inversion [2].

Despite there are many existing techniques for image SR, the techniques for single-image SR are relatively fewer. There is a need in the art for improved techniques on single-image SR.

SUMMARY OF THE INVENTION

An aspect of the present invention is to provide a SR method for generating a HR image from a LR blurred image.

The method comprises determining an affine transform for transforming a first image into a second image that is aligned horizontally and vertically with the first image. In particular, the affine transform is determined from the LR blurred image such that a weighted sum of a Schatten$_{p=1/2}$-norm ($S_{1/2}$-norm) of a low-rank component and a $L_{1/2}$-norm of a sparse component is substantially minimized. The low-rank component and the spare component are obtained by applying a candidate affine transform to the LR blurred image to yield a third image and then decomposing the third image into the low-rank component for representing an edge structure of the third image, and the spare component for representing noise or blur information thereof.

Advantageously and preferably, the determining of the affine transform comprises iteratively refining the candidate affine transform so as to successively reduce the weighted sum. The refining of the candidate affine transform may be iterated until a percentage reduction of the weighted sum obtained in an iteration is less than a pre-determined threshold.

The method further comprises determining the HR image by a transform-invariant directional total variation regularization method. This regularization method comprises computing a directional total variation of a transformed image where the transformed image is obtained by applying the determined affine transform to a candidate HR image.

Preferably, the determining of the HR image comprises iteratively refining the candidate HR image so as to successively reduce a regularization-based cost function.

Other aspects of the present invention are disclosed as illustrated by the embodiments hereinafter.

BRIEF DESCRIPTION OF THE DRAWINGS

FIG. 3 shows, as one set of experimental results, 4 original LR text images and their corresponding high SR images obtained by the 4 different methods.

DETAILED DESCRIPTION

Figure 1:
FIG. 1 shows, as one set of experimental results, the low-rank components (middle) and sparse components (right) decomposed by the disclosed $S_{1/2}+L_{1/2}$ method and the TILT method from the LR image on the left.

The present invention is concerned with a method of single-image SR. A novel transform-invariant directional total variation (TI-DTV) approach with Schatten$_{p=1/2}$ ($S_{1/2}$-norm) and $L_{1/2}$-norm penalties (TI-DTV+$S_{1/2}$+$L_{1/2}$) with a particular objective for single image SR is investigated. The $L_{1/2}$-norm and $S_{1/2}$-norm penalties can be taken as a representative of $L_q$ ($0<q<1$) and Schatten$_p$ ($0<p<1$) regularization, respectively. In [32], Xu et al. have demonstrated many attractive properties of the $L_{1/2}$-norm penalty, such as unbiasedness, sparsity and oracle properties. In [24], Rao et al. have demonstrated that the $S_{1/2}$-norm can induce the efficient lower-rank components for the matrix decomposition. Moreover, inspired by the alternating direction method of multipliers (ADMM), herein it is proposed the alternating threshold iterative algorithm which utilizes the augmented Lagrange multiplier technique and iteratively updates both the low-rank and sparse components, which use to learn transform that maps the image to a domain where its gradient has a simple group-sparse structure. Numerous experiments as reported hereinafter show that the disclosed method is competitive against state-of-the-art single image SR methods.

A. TI-DTV MODEL WITH THE $S_{1/2}$-NORM AND $L_{1/2}$-NORM PENALTIES

In [20], for an image $I \in R^{N_1 \times N_2}$, the directional total variation (DTV) is defined as $$DTV(I) = \sum_{x=1}^{N_1} \sqrt{\sum_{y=1}^{N_2-1} (I(x, y+1))} + \sum_{y=1}^{N_2} \sqrt{\sum_{x=1}^{N_1-1} (I(x+1, y))}. \qquad (1)$$

However, the limitation of the formula (1) is that one cannot ensure that the edges are perfectly aligned horizontally and vertically in the image. Hence, the $I \circ \tau$ were proposed as the affine of the real image I, which the $I \circ \tau$ were aligned horizontally and vertically, where $\tau$ is the affine or projective transform. The cost function of TI-DTV is given by [20]

$$TI\text{-}DTV(I) = DTV(I \circ \tau). \qquad (2)$$

The transform-invariant low-rank textures (TILT) [23] approach was selected to get the transform $\tau$. Then the function is introduced as $$\min \|A\|_* + \lambda \|E\|_1 \, s.t. \, I \circ \tau = A + E, \qquad (3)$$

where A and E are the low-rank and sparse components respectively, $\|A\|_*$ is the nuclear norm ($S_1$-norm), which is sum of singular values of A, $\|E\|_1$ is the $L_1$-norm, which is sum of absolute values of the entries of E, and then the parameter A is used to balance the contribution of the $L_1$-norm.

In the recent research works of regularization, the $L_{1/2}$-norm and $S_{1/2}$-norm penalties can be taken as a representative of $L_q$ (0<q<1) and Schatten$_p$ (0<p<1) regularization, respectively. In [32], Xu et al. have demonstrated many attractive properties of $L_{1/2}$-norm penalty, such as unbiasedness, sparsity and oracle properties. In [24], Rao et al. have demonstrated that $S_{1/2}$-norm can induce the efficient lower rank components for the matrix decomposition. When one considers the $S_{1/2}$-norm and $L_{1/2}$-norm, formula (3) can be rewritten as $$\min \|A\|_{S_{1/2}}^{1/2} + \lambda \|E\|_{1/2}^{1/2} \, s.t. \, Io\tau = A+E, \quad (4)$$

where A and E are the low-rank and sparse components respectively, $\|A\|_{S_{1/2}}^{1/2}$ is the $S_{1/2}$-norm of A, which is used to induce the lower rank component, $\|E\|_{1/2}^{1/2}$ is the $L_{1/2}$-norm of E, which is to used to induce more sparse component, and then the parameter $\lambda$ is used to balance the contribution of the $L_{1/2}$-norm.

One can apply the alternating threshold iterative algorithm to solve the formula (4). Generally, in the decomposition of the LR image, the low-rank component represents the edge structure, and the sparse component contains the noise or blur information respectively. FIG. 1 demonstrates the results of the low-rank component (middle) and the sparse component (right) decomposed by the disclosed $S_{1/2}+L_{1/2}$ method and the TILT method from the LR image on the left. It is clearly shown that compared to the $S_{1/2}+L_{1/2}$ method, the sparse component obtained by the TILT method contains more edge structure information. It means that the $S_{1/2}+L_{1/2}$ method can get more efficient and sparse component. In the experiments to be reported below, it will be shown that the ranks of the low-rank components obtained by the $S_{1/2}+L_{1/2}$ method are also smaller than those of the TILT method. Therefore, the $S_{1/2}+L_{1/2}$ method can induce the efficient low-rank and sparse decomposition for image SR.

B. ALGORITHM AND SR CONSTRUCTION

B.1 the Alternating Threshold Iterative Algorithm Based on ADMM

ADMM decomposes a large problem into lots of subproblems, and coordinates the local solutions to compute globally optimal solutions. Generally, the problems solved by ADMM take the following form:

$$\min_{x,z} f(x) + g(z) \, s.t. \, Mx + Nz = c$$

where: $x \in R^N$; $z \in R^M$; $M \in R^{P \times N}$; $N \Sigma R^{P \times M}$; and f and g are convex functions. ADMM reformulates the problem using a variant of the augmented Lagrangian methods as follows:

$$L_\mu(x, z, y) = f(x) + g(z) + y^T(Mx + Nz - c) + \frac{1}{2}\mu \|Mx - Nz - c\|_2^2, \quad (6)$$

where y is the augmented Lagrangian multiplier, and $\mu$ is the nonnegative parameter. ADMM solves the original problems by iteratively minimizing $\epsilon_p(x,z,\mu)$ over x, z and updating $\mu$ according to the following rules:

$$\begin{cases} x^{k+1} = \operatorname{argmin}_x L_\mu(x, z^k, y^k) \\ z^\uparrow(k+1) = [\operatorname{argmin}]_{\downarrow z} L_1 \mu(x^\uparrow(k+1), z, y^\uparrow k) \\ y^{k+1} = y^k + \mu(Mx^{k+1} + Nz^{k+1} - c) \end{cases} \quad (7)$$

In the present invention, an iterative alternating thresholding algorithm is designed based on ADMM to solve the model (4). First of all, the augmented Lagrange function is considered as follows:

$$L_\mu(A, E, Y) = \quad (8)$$
$$\|A\|_{S_{1/2}}^{1/2} + \lambda \|E\|_{1/2}^{1/2} + \langle Y, Io\tau - A - E \rangle + \frac{1}{2}\mu \|Io\tau - A - E\|_F^2,$$

where Y is the augmented Lagrangian multiplier, and $\mu$ is the nonnegative parameter. Since $L_\mu(A,E,Y)$ is the minimization if $\mu = \infty$, one can obtain the solution by iterations as follows:

$$\begin{cases} A_{k+1} = \operatorname{argmin}_A L_\mu(A, E_k, Y_k) \\ E_{k+1} = \operatorname{argmin}_E L_\mu(A_{k+1}, E, Y_{k+1}) \\ Y_{k+1} = Y_k + \mu(Io\tau + A_k - E_k) \end{cases} \quad (9)$$

In order to simplify formula (9), the following formulas are given:

$$\begin{cases} A_{k+1} = \operatorname{argmin}_A \frac{1}{2} \left\| A - \left( Io\tau - E_k + \frac{1}{\mu} Y_k \right) \right\|_F^2 + \|A\|_{S_{1/2}}^{1/2} \\ E_{k+1} = \operatorname{argmin}_E \frac{1}{2???} \left\| E - \left( Io\tau - A_{k+1} + \frac{1}{\mu} Y_k \right) \right\|_F^2 + \|E\|_{l_a}^a \\ Y_{k+1} = Y_k + \mu(Io\tau - A_{k+1} - E_{k+1}) \end{cases} \quad (10)$$

This alternate iteration thresholding algorithm is the key to update the low-rank and sparse components, and the Lagrange multiplier, until the predetermined convergence condition is met.

The low-rank and sparse components of formula (10) can be simplified as $$\min_X \|X - W\|_F^2 + \lambda \|X\|_{l_a}^a \quad (11)$$

and $$\min_X \|X - W\|_F^2 + \lambda \|X\|_{S_{1/2}}^{1/2}. \quad (12)$$

It is easy to solve Problem (11), and [25] has proved that if a=1, its optimal solution is $ST_{\lambda/2}(w)$. For each component x in the components W, $ST_\lambda(x)$ represents the soft-thresholding [26] or shrinkage operator which is defined on scalars as follows:

$$ST_\lambda(x) = \begin{cases} x - \operatorname{sgn}(x)\lambda, & |x| > \lambda \\ 0 & \text{otherwise} \end{cases} \quad (13)$$

Similarly, for formula (12), its optimal solution is $H_\lambda(w)$ if a=1/2. For each component x in the components W, $H_{80}(x)$ represents the Half-thresholding [27] or shrinkage operator which is defined as $$H_\lambda(x) = \begin{cases} \frac{2}{3}x\left(1 + \cos\left(\frac{2\pi}{3} - \frac{2\varphi(x)}{3}\right)\right), & |x| > \frac{\sqrt[3]{54}}{4}\lambda^{2/3} \\ 0, & \text{otherwise} \end{cases} \quad (14)$$

where

-continued $$\varphi(x) = \arccos\left(\frac{\lambda}{8}\left(\frac{|x|}{3}\right)\right)^{-3/2}.$$

B.2 Super-Resolution Via TI-DTV with the $S_{1/2}$-Norm and $L_{1/2}$-Norm Regularization In this section, for the high quality SR from a LR image, we use a formula as follows [20]:

$$I_{LR} \approx D(K \otimes I_{HR})$$

where: $I_{LR}$ and $I_{HR}$ stand for the LR image and the HR image, respectively; D is a down-sampling operator; and K is a blurring kernel.

In order to get the HR image, a formula is introduced based on the affine or projective transform τ obtained by the $S_{1/2}$-norm and $L_{1/2}$-norm regularization as follows [20]:

$$\min_{I_{HR}} \|D(K \otimes I_{HR}) - I_{LR}\|_2 + \lambda \cdot DTV(A_\tau I_{HR}) + \beta \cdot TV(I_{HR}) \quad (16)$$

where λ and β are regularization parameters, $A_\tau$ is the linear operator of τ to map the image to the domain. In order to solve the formula (16), we use Templates for First-Order Conic Solvers (TFOCS) framework proposed in [28]. For the color information in the image, we use bicubic interpolation as well.

As a result, it yields the alternating threshold iterative algorithm as shown in Algorithm 1 below.

---

Algorithm 1: The alternating threshold iterative algorithm

---

Input: the current image $I_{0\tau} \in R^{M \times N}$
Step 1: Initialization:
K = 0; $A_0$ = 0; $Y_0$ = 0; $E_0$ = 0; Δ$τ_0$ > 0; $μ_0$ > 0; p > 1
Step 2:
$I_{0\tau} - E_k + μ^{-1} Y_k = U_r S_r V_r^T$;

$A_{k+1} = U_r H_{\frac{2}{\mu}}(S_r) V_r^T$

Step 3:
$E_{k+1} = H_{\frac{2\eta\eta}{\mu}}(I_{0\tau} - A_{k+1} + μ^{-1} Y_k)$

Step 4:
$\Delta τ_{k+1} = (\nabla I)^+(A_{k+1} + E_{k+1} - I_{0\tau} - μ^{-1} Y_k)$ Step 5:
$Y_{k+1} = Y_k + μ(I_{0\tau} - A_{k+1} - μ^{-1} Y_{k+1})$ Step 6:
$μ_{k+1} = ρμ_k$ Step 7:
If $\frac{\|I_{0\tau} - A_{k+1} - E_{k+1}\|_F}{\|I_{0\tau}\|_F} < \varepsilon$ for a pre-determined threshold, repeat Step 2.
Output: Get A, E and τ.

---

C. EXPERIMENTS

C.1 Data Preprocessing and Simulation Methods

Figure 2:
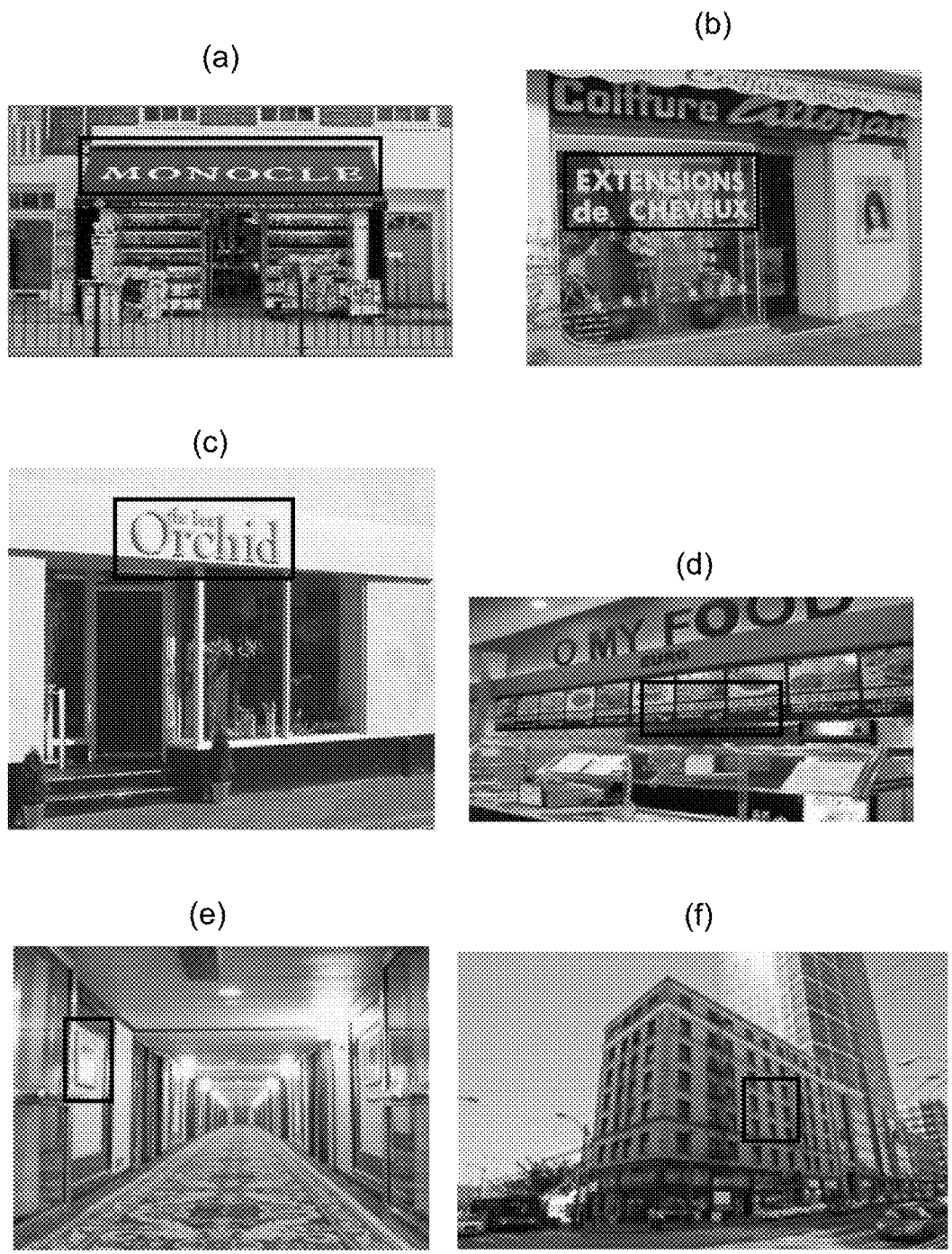
FIG. 2 depicts 6 images, which consist of 4 text images and 2 real images, from SUN database, where the small part highlighted as a highlighted rectangle in each image is selected as an input for SR.

In this section, six images, which consist of four text images and two real images, were used from SUN database [29]. As shown in FIG. 2, the small part in the green rectangle of each image was selected as input for SR. In the experiments, three methods were applied to compare with the disclosed approach, namely, bilinear interpolation, bicubic interpolation and TI-DTV+TILT, which are commonly-used single-image SR methods. An up-sampling factor of 8, adopted from [20], was used for each method.

All the experiments were performed using MATLAB (R2014b) on a workstation with Intel Core i7-4790 processor of 3.60 GHz and 8 GB of RAM equipped with Windows 8.1 OS.

C.2 Super-Resolution of Text Images

In this section, we first evaluate the performance of the affine or projective transform between the $S_{1/2}+L_{1/2}$ and the TILT methods based on the text images.

TABLE 1

For SR of text images, the ranks of the low-rank component A, the number of zero and the percentage of zeros in the sparse component E are gotten by the TILT and the $S_{1/2} + L_{1/2}$ methods.

| Image | Method | Rank(A) | Zero(E) | Percentage of Zeros (E) |
|---|---|---|---|---|
| a | TILT | 98 | 53952 | 96.17% |
|   | $S_{1/2} + L_{1/2}$ | 96 | 55421 | 98.79% |
| b | TILT | 92 | 18538 | 78.22% |
|   | $S_{1/2} + L_{1/2}$ | 80 | 20219 | 85.31% |
| c | TILT | 76 | 12355 | 69.41% |
|   | $S_{1/2} + L_{1/2}$ | 61 | 14235 | 79.97% |
| d | TILT | 77 | 10312 | 64.05% |
|   | $S_{1/2} + L_{1/2}$ | 65 | 12672 | 78.71% |

As shown in Table 1, it is apparent that the disclosed $S_{1/2}+L_{1/2}$ method can induce lower rank and more sparse components. For example, for all 4 text images, the ranks of the low-rank components of the $S_{1/2}+L_{1/2}$ method are 2, 12, 15 and 12 lower than those of the TILT method. Furthermore, the percentage of the number of zero in the sparse components obtained by the $S_{1/2}+L_{1/2}$ method is 2.62%, 7.09%, 10.56% and 14.66% higher than those of the TILT method. Therefore, the $S_{1/2}$-norm and $L_{1/2}$-norm regularizations have the capable of effectively inducing lower rank and more sparse decompositions respectively.

Figure 3:
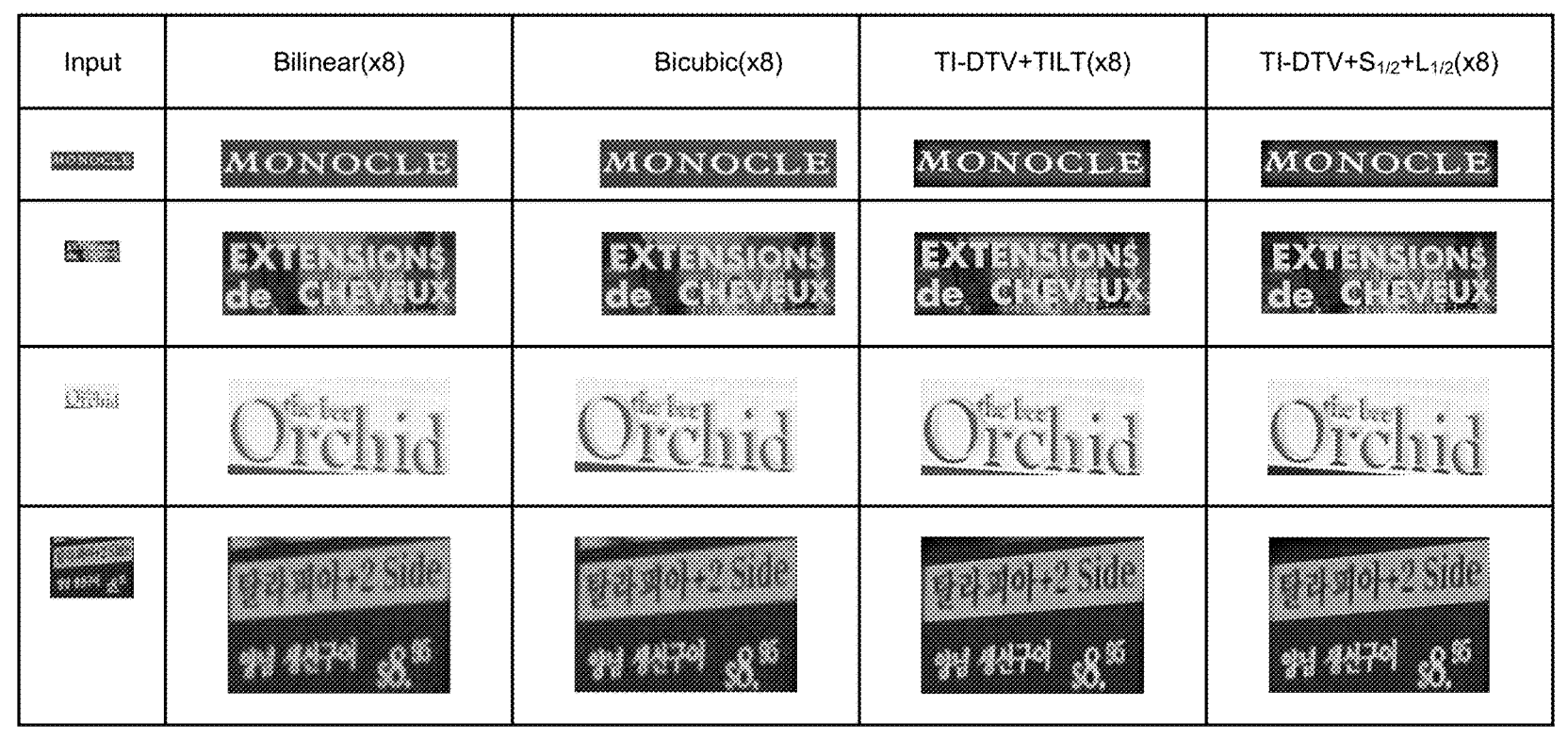

To demonstrate the capability of the $S_{1/2}+L_{1/2}$ regularization for SR text images on distorted surfaces, FIG. 3 shows the 4 original LR images and their corresponding high SR images obtained by 4 different methods. In all cases, the bilinear and bicubic interpolation produce SR images that are very blurry. On the other hand, the both regularization methods are clearly superior.

Figure 4:
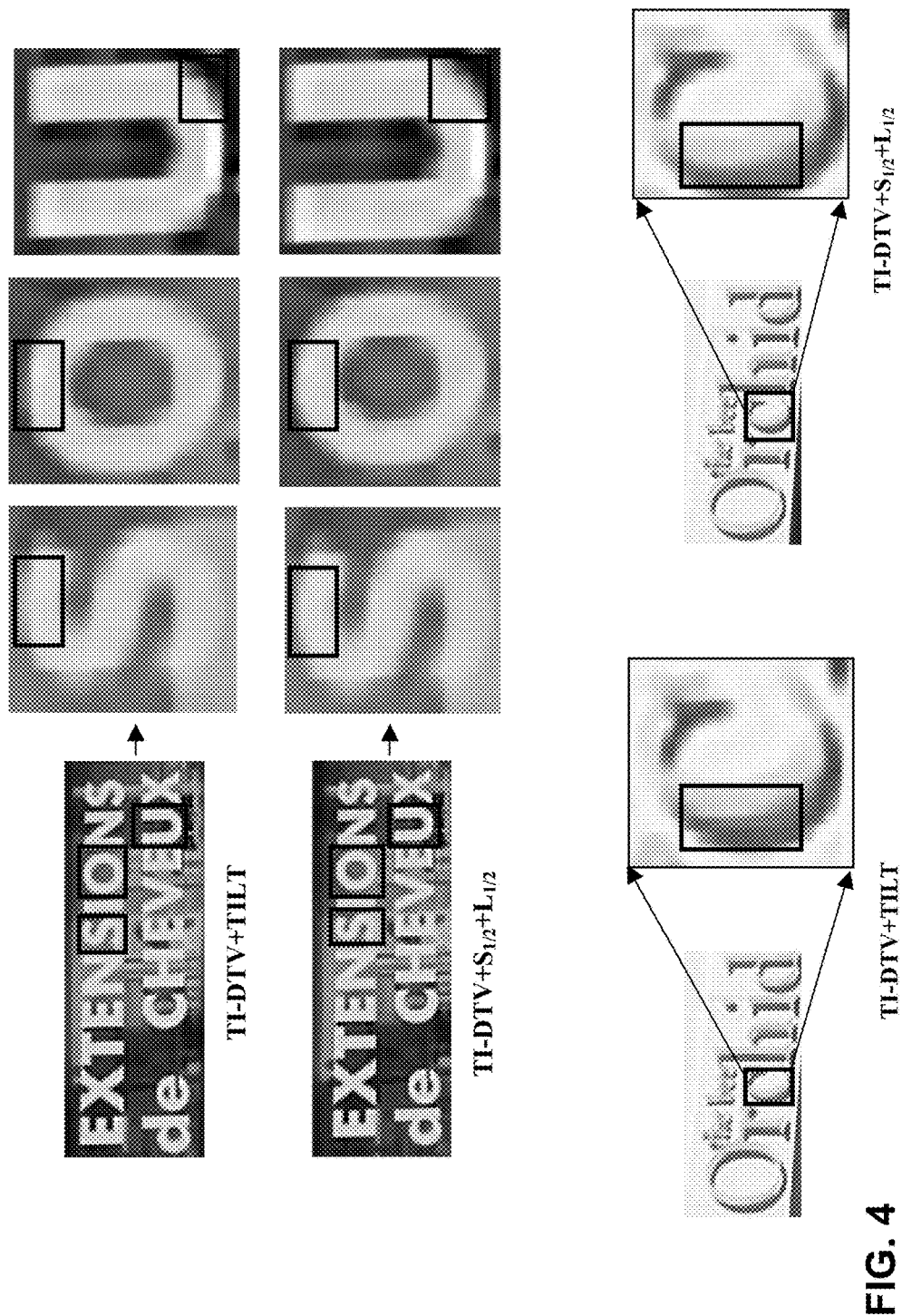
FIG. 4 shows the differences of high SR images obtained by the TI-DTV+TILT and the TI-DTV $S_{1/2}+L_{1/2}$ methods, where the small parts in highlighted rectangles indicate that the arcs of the letters 'S', 'O', 'U' and 'C' obtained by the disclosed method are much smoother and clearer than those obtained by the TI-DTV+TILT method.

In fact, we have made clear that the both regularization methods are to process the SR of planar surfaces that are approximately low-rank and have horizontal or vertical straight edges that are oriented following the low-rank structure. As shown in FIG. 3, the horizontal or vertical straight edges in the text images are super-resolved as same as sharp using these two regularization methods. If these conditions are not satisfied, such as diagonal line and arc, the high SR images obtained from the TI-DTV+TILT method produce jagged artifacts along the diagonal line and arc. It is also the major limitation of TI-DTV+TILT as reported in [20]. However, as shown in the blue and yellow rectangle in FIG. 4, the arcs of the letters 'S', 'O', 'U' and 'C' obtained by the disclosed method are much smooth and clear than those of the TI-DTV+TILT method. Therefore, the disclosed method can make horizontal or vertical straight edges of letters sharp. Furthermore, the disclosed method has the capability to decrease the jagged artifacts along the diagonal line and arcs in the letters and make them smoother and clearer for high quality SR text images.

C.3 Super-Resolution of Real Images

In this section, we first consider to use the $S_{1/2}+L_{1/2}$ method and the TILT method to decompose the real images e and f in FIG. 2.

TABLE 2

For SR of real images, the ranks of the low-rank component A, the number of zero and the percentage of zeros in the sparse component E are gotten by the TILT and the $S_{1/2} + L_{1/2}$ methods.

| Image | Method | Rank(A) | Zero(E) | Percentage of Zeros (E) |
|---|---|---|---|---|
| e | TILT | 53 | 16316 | 36.18% |
|   | $S_{1/2} + L_{1/2}$ | 30 | 18032 | 39.98% |
| f | TILT | 55 | 9473 | 35.35% |
|   | $S_{1/2} + L_{1/2}$ | 41 | 13998 | 52.23% |

As shown in Table 2, the disclosed method can also induce lower rank and more sparse components. For example, for images e and f, the ranks of the low-rank components obtained by the $S_{1/2}+L_{1/2}$ method are 30 and 41 lower than 53 and 55 got by the TILT method. Moreover, the percentage of the number of zeroes in the sparse components of the $S_{1/2}+L_{1/2}$ method is 39.98% and 52.23% higher than those (36.18% and 35.35%) of the TILT method. Therefore, similar to the case of processing the text images above, the $S_{1/2}$-norm and the $L_{1/2}$-norm regularization has the capability to induce lower rank and more sparse decomposition respectively.

Figure 5:
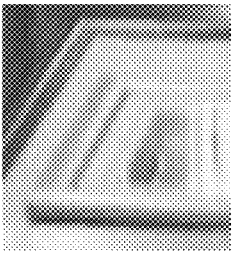
FIG. 5 shows, as one set of experimental results, 2 original LR real images and their corresponding high SR images obtained by the 4 different methods.

FIG. 5 shows the original input images and their corresponding SR images which are produced by bilinear interpolation, bicubic interpolation, TI-DTV+TILT and TI-DTV+$S_{1/2}+L_{1/2}$ approaches. In FIG. 5, we can clearly observe that the both regularization methods produce clear straight edges in the global geometry of the planar surface, and the horizontal or vertical straight edges in their SR images are significantly sharper than those of the bicubic and bicubic interpolation methods.

Moreover, it is difficult to find their differences in the high quality SR images obtained by the both regularization methods. It is also known that the results obtained by the TI-DTV+TILT regularization are described as state of the art [20]. Therefore, the disclosed method is also capable of effectively super-resolving LR images similar to the TI-DTV+TILT method.

C.4 Super-Resolution of the Small Size Test Images

During doing some experiments, it was found that the disclosed method can effectively recover more regions of the planar surface. To demonstrate this effect, we constructed two small size images setting to 50×50 and added color to them. Since in previous experiments, large-size images were used and this effect of recovering more region was not observed easily. Here, we only consider the regularization method: the TI-DTV+TILT method and the disclosed TI-DTV+$S_{1/2}+L_{1/2}$ method. The up-sampling factor is 8 for each method [20].

TABLE 3

For SR of test images, the ranks of the low-rank component A, the number of zero and the percentage of zeros in the sparse component E are gotten by the TILT and the $S_{1/2} + L_{1/2}$ methods.

| Image | Method | Rank(A) | Zero | Percentage of Zeros (E) |
|---|---|---|---|---|
| g | TILT | 29 | 7045 | 70.45% |
|   | $S_{1/2} + L_{1/2}$ | 27 | 8214 | 82.14% |
| h | TILT | 24 | 7203 | 72.03% |
|   | $S_{1/2} + L_{1/2}$ | 21 | 7689 | 76.89% |

The low-rank and sparse results of the two regularization methods are presented in Table 3. For images g and h, the ranks of the low-rank components of the $S_{1/2}+L_{1/2}$ method are 27 and 21, lower than 29 and 24, respectively, of the TILT method. Moreover, the percentage of the number of zeroes in the sparse components obtained by the $S_{1/2}+L_{1/2}$ method is 82.14% and 76.89%, higher than 70.45% and 72.03%, respectively, of the TILT method.

Figure 6:
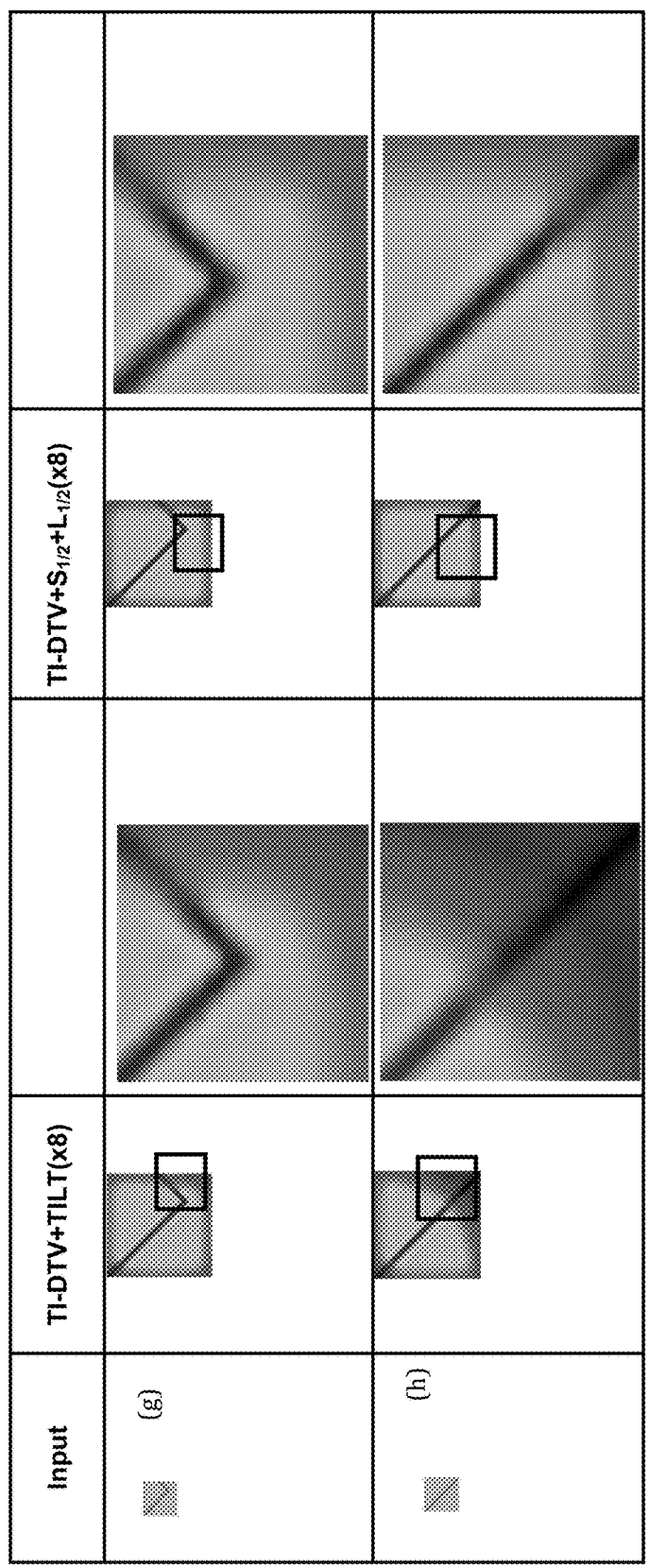
FIG. 6 depicts test images obtained by different regularization methods for SR, where the marked rectangle indicates the differences recovered by the two regularization approaches.

The results of high SR images are obtained by two different regularization methods in FIG. 6. One can find that the part in the red rectangle indicates the information just recovered by the disclosed TI-DTV+$S_{1/2}+L_{1/2}$ approach.

D. THE PRESENT INVENTION

An aspect of the present invention is to provide a method for generating a HR image $I_{HR}$ from a LR blurred image $I_{LR}$. In general, the method is realizable by a computer-based system comprising one or more processors, such as an image-processing system and a computer-vision system.

Figure 7:
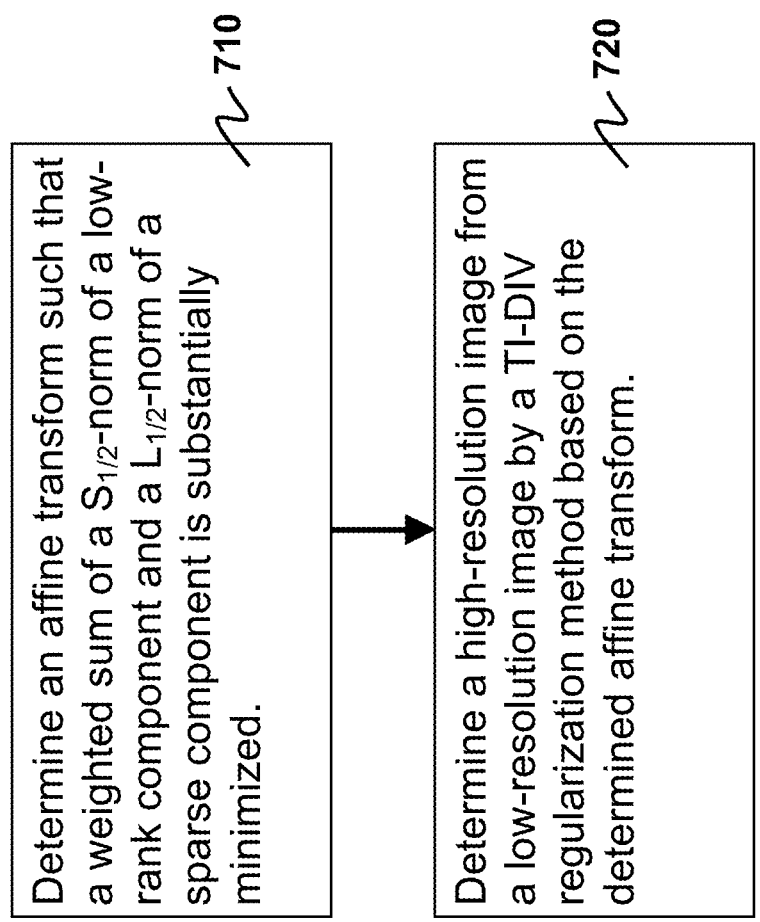
FIG. 7 provides a flowchart depicting, in accordance with an exemplary embodiment of the present invention, a method for generating a HR image from a single LR blurred image.

Exemplarily, the method is illustrated with an aid of FIG. 7.

In a first step 710, an affine transform τ for transforming a first image into a second image that is aligned horizontally and vertically with the first image is determined. In particular, the affine transform τ is determined from $I_{LR}$ such that a weighted sum of a $S_{1/2}$-norm of a low-rank component and a $L_{1/2}$-norm of a sparse component is substantially minimized. The low-rank component and the spare component are obtained by applying a candidate affine transform to $I_{LR}$ to yield a third image and then decomposing the third image into the low-rank component for representing an edge structure of the third image, and the spare component for representing noise or blur information of the third image. As used herein, a candidate affine transform is an affine transform proposed for consideration or investigation whether this candidate affine transform can satisfy the requirement related to the weighted sum. Also, herein in the specification and in the appended claims, "an affine transform is determined such that a weighted sum is substantially minimized" means that the weighted sum resulted from the determined affine transform is substantially close to or exactly is a local minimum among a number of candidate affine transforms in the neighborhood of the determined affine transform.

Although the determination of r can be accomplished by any technique, τ can be efficiently determined by an iterative algorithm as shown in Section B.1. It follows that the determining of the affine transform comprises iteratively refining the candidate affine transform so as to successively reduce the weighted sum. In one embodiment, a set of formulas shown in (10) is used for iteration. As is shown in Algorithm 1 above, the refining of the candidate affine transform may be iterated until a percentage reduction of the weighted sum obtained in an iteration is less than a predetermined threshold. For example, Algorithm above provides a percentage-reduction criterion.

In one option, the weighted sum is given by formula (4).

In a second step 720, $I_{HR}$ is determined by a TI-DTV regularization method as expounded in Section B. In addition, the regularization method comprises computing a DTV of a transformed image obtained by applying the determined affine transform τ to a candidate HR image, as is exemplarily shown in (16), which is a regularization-method cost function used in determining $I_{HR}$. Preferably, the determining of the HR image comprises iteratively refining the candidate HR image so as to successively reduce a regularization-based cost function.

The embodiments disclosed herein may be implemented using general purpose or specialized computing devices, computer processors, or electronic circuitries including but not limited to digital signal processors, application specific integrated circuits, field programmable gate arrays, and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for generating a high-resolution image from a low-resolution blurred image by one or more processors, the method comprising:

determining an affine transform for transforming a first image into a second image that is aligned horizontally and vertically with the first image, the affine transform being determined from the low-resolution blurred image such that a weighted sum of a Schatten$_{p=1/2}$-norm ($S_{1/2}$-norm) of a low-rank component and a $L_{1/2}$-norm of a sparse component is substantially minimized;

wherein the low-rank component and the spare component are obtained by applying a candidate affine transform to the low-resolution blurred image to yield a third image and then decomposing the third image into the low-rank component for representing an edge structure of the third image, and the spare component for representing noise or blur information thereof;

wherein the determining of the affine transform comprises iteratively refining the candidate affine transform so as to successively reduce the weighted sum, wherein the weighted sum is given by $$\|A\|_{S_{1/2}}^{1/2} + \lambda \|E\|_{1/2}^{1/2}$$

where:
A and E are the low-rank component and the sparse component, respectively,
$\|A\|_{S_{1/2}}^{1/2}$ is the $S_{1/2}$-norm of A,
$\|E\|_{1/2}^{1/2}$ is the $L_{1/2}$-norm of E, and
λ is a pre-determined parameter for balancing a contribution of the $L_{1/2}$-norm with the weighted sum;

wherein the candidate affine transform is iteratively refined according to $$\begin{cases} A_{k+1} = \operatorname{argmin}_A \frac{1}{2} \left\| A - \left( I \circ \tau - E_k + \frac{1}{\mu} Y_k \right) \right\|_F^2 + \|A\|_{S_{1/2}}^{1/2} \\ E_{k+1} = \operatorname{argmin}_E \frac{1}{2\lambda} \left\| E - \left( I \circ \tau - A_{k+1} + \frac{1}{\mu} Y_k \right) \right\|_F^2 + \|E\|_{l_a}^a \\ Y_{k+1} = Y_k + \mu (I \circ \tau - A_{k+1} - E_{k+1}) \end{cases}$$

where:
$I \circ \tau = A_k + E_k$,
$A_k$ is the low-rank component obtained in a k th iteration, and $A_{k+1}$ is the low-rank component obtained in a (k+1)th iteration, an iteration immediately after the k th iteration,
$E_k$ is the spare component obtained in the k th iteration, and $E_{k+1}$ is the spare component obtained in the (k+1)th iteration,
$Y_k$ is an augmented Lagrangian multiplier obtained in the k th iteration, and $Y_{k+1}$ is an augmented Lagrangian multiplier obtained in the (k+1)th iteration,
μ is a nonnegative parameter,
$\|A_{S_{1/2}}\|^{1/2}$ denotes a $S_{1/2}$-norm, and
$\|E\|_{l_q}^a$ denotes a $L_{1/2}$-norm;

wherein the candidate affine transform is iteratively refined until $$\frac{\|I \circ \tau - A_{k+1} - E_{k+1}\|_F}{\|I \circ \tau\|_F} < \varepsilon$$

is satisfied, where ϵ is a pre-determined threshold;

wherein the iterative refinement of the candidate affine transform is computed by an iterative process comprising:

Step 1: performing an initialization comprising:

$K=0; A_0=0; Y_0=0; E_0=0; \Delta\tau_0>0; \mu_0>0; \rho>1;$

Step 2: determining:

$I \circ \tau - E_k + \mu^{-1} Y_k = U_r S^r V_r^T;$ $$A_{k+1} = U_r H_{\frac{2}{\mu}}(S_r) V_r^T$$

Step 3: determining:

$$E_{k+1} = H_{\frac{2\lambda}{\mu}}(I \circ \tau - A_{k+1} + \mu^{-k} Y_k)$$

Step 4: determining:

$\Delta\tau_{k+1} = (\nabla I)^+ (A_{k+1} + E_{k+1} - I \circ \tau - \mu^{-1} Y_k)$ Step 5: determining:

$Y_{k+1} = Y_k + \mu (I \circ \tau - A_{k+1} - \mu^{-1} Y_{k+1})$

Step 6: determining:

$\mu_{k+1} = \rho \mu_k$

Step 7:
if $$\frac{\|I \circ \tau - A_{k+1} - E_{k+1}\|_F}{\|I \circ \tau\|_F} < \varepsilon$$

for the pre-determined threshold, repeat Step 2;
otherwise set values for A, E and τ; and
generating the high-resolution image by a transform-invariant directional total variation (TI-DTV) regularization method,
wherein the regularization method comprises computing a directional total variation (DTV) of a transformed image obtained by applying the determined affine transform to a candidate high-resolution image.

2. The method of claim 1, wherein the determining of the high-resolution image comprises iteratively refining the candidate high-resolution image so as to successively reduce a regularization-based cost function.

3. The method of claim 2, wherein the regularization-based cost function is given by $$\|D(K \otimes I'_{HR}) - I_{LR}\|_2 + \lambda \cdot DTV(A_\tau I'_{HR}) + \beta \cdot TV(I'_{HR})$$

where:
$I_{LR}$ is the low-resolution blurred image;
$I'_{HR}$ is the candidate high-resolution image;
D is a down-sampling operator;
K is a blurring kernel;
λ and β are regularization parameters;
$A_\tau$ is a linear operator of the affine transform;
TV denotes a total variation; and
DTV denotes a directional total variation given by $$DTV(I) = \sum_{x=1}^{N_1} \sqrt{\sum_{y=1}^{N_2-1} (I(x, y+1))} + \sum_{y=1}^{N_2} \sqrt{\sum_{x=1}^{N_1-1} (I(x+1, y))}$$

for an image $I \in R^{N_1 \times N_2}$.

4. An image-processing system comprising one or more processors configured to generate a high-resolution image from a low-resolution blurred image by the method of claim 1.

5. An image-processing system comprising one or more processors configured to generate a high-resolution image from a low-resolution blurred image by the method of claim 2.

6. An image-processing system comprising one or more processors configured to generate a high-resolution image from a low-resolution blurred image by the method of claim 3.

* * * * *